(12) United States Patent
Hrazdera et al.

(10) Patent No.: US 6,704,637 B1
(45) Date of Patent: Mar. 9, 2004

(54) SPEED CONTROL FOR A WORK VEHICLE

(75) Inventors: Oliver Hrazdera, Enns (AT); Helmut Kubin, Steyr (AT); Hans Hochauer, Mank (AT)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/031,294

(22) PCT Filed: Apr. 28, 2000

(86) PCT No.: PCT/AT00/00110

§ 371 (c)(1),
(2), (4) Date: Jun. 10, 2002

(87) PCT Pub. No.: WO00/66386

PCT Pub. Date: Nov. 9, 2000

(30) Foreign Application Priority Data

Apr. 28, 1999 (AT) ........................................ GM 291/99

(51) Int. Cl.$^7$ ................................................. B60T 8/32
(52) U.S. Cl. ........................ 701/93; 180/170; 477/107
(58) Field of Search .......................... 701/93; 180/170; 74/730.1; 477/120, 107

(56) References Cited

U.S. PATENT DOCUMENTS 4,513,836 A * 4/1985 Treadwell .................... 180/177
5,971,888 A * 10/1999 Goode ......................... 477/107

* cited by examiner

*Primary Examiner*—Marthe Y. Marc-Coleman
(74) *Attorney, Agent, or Firm*—John William Stader; Collin A. Webb; Brant T. Maurer

(57) ABSTRACT

There is disclosed herein a method and apparatus for changing the real speed of a work vehicle with a continuously variable transmission and an electronic control device having a cruise control function.

12 Claims, 5 Drawing Sheets

SPEED CONTROL FOR A WORK VEHICLE

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

In general terms, the invention relates to a system and a method for changing the real speed of a work vehicle with a continuously variable transmission and an electronic control device with cruise control function.

A motor vehicle comprising a system of the type mentioned above is known from European Patent EP-A2-0 305 156. With this apparatus, the transmission ratio is controlled in response to the motor load and the desired driving speed in a manner to maintain this driving speed as far as possible.

Further, the general construction and the mode of operation of an example of a cruise control apparatus may be seen from the publication "VDO Querschnitt 2", May 1979 of the company VDO Adolf Schindling AG, Schwalbach, Germany.

The work vehicle may be a construction vehicle, an agricultural vehicle or a municipal vehicle, and the continuously variable transmission may be of any type. As an example and especially, a power distribution transmission having a control in accordance with European Patent EP-A1-0967 107 is taken into consideration.

With continuously variable transmissions for work vehicles, a cruise control function is required to exactly maintain the optimum speed)during lengthy work trips (for instance sweeping, plowing, or mowing). Under these circumstances it is necessary in certain situations to temporarily drive with a different (in most cases, lower) speed and then resume driving with the optimum speed. Such situations may be: turning on the headlands when plowing, where narrow turns have to be made and where it is often necessary to drive back and forth; driving faster over bare areas when mowing; driving downhill with heavy towed loads, wherein possibly the real or actual speed has to be reduced; and, finally, when making an emergency stop. Thereafter, the optimum speed automatically and exactly has to be reached again. It is desirable to be able to memorize also the reduced speed in a reproducible manner.

On making narrow turns, it is necessary and conventional with agricultural tractors to use steering brakes. This term is used for service brake systems that are split up to the brake pedal such that on actuating one half pedal only the wheel on the inner side of the turn is braked. It is, of course, not possible to simultaneously actuate by foot the brake and a further pedal for changing the real speed.

BRIEF SUMMARY OF THE INVENTION

It is therefore an object of the invention to design a system and a method, respectively, of the type set out above in such a manner that all operational requirements mentioned above may be fulfilled, i.e., to provide the cruise control function in an exclusively manually interruptable manner, such that a simple and safe handling of special situations is facilitated.

In accordance with one aspect of the invention, a system for changing the real speed of a work vehicle with a continuously variable transmission and an electronic control device with cruise control function is provided, said system comprising the following operating elements:

a) an actuating element for changing the real speed of the vehicle, said real speed being continuously memorized as a first real speed and being maintained by the cruise control function if no readjustment takes place, and b) at least one switch for disenabling and re-enabling the cruise control function, wherein the set first real speed is kept memorized on disabling and is set again on re-enabling, This apparatus is characterized in that a further switch is provided, a speed, especially of zero, corresponding to a standstill of the vehicle, being adjustable by actuation of said further switch, whereupon by means of the actuating element a second real speed is adjustable for the maneuvering travel, said speed increasing up to a predetermined maximum value as long as the actuating element remains activated, and in that by actuating the further switch again, the cruise control function for the first real speed may be re-enabled.

According to an advantageous development, a switch is provided, a second real speed being adjustable and memorizable by means of the actuating element after actuation of said switch, and in that by actuating said switch again, the cruise control function for the first real speed may be re-enabled and the second real speed that was finally adjusted, is memorized.

Said at least one switch may be a switch that permits, after actuation thereof, adjustment of a second real speed by means of the same actuating element. Thus, the switch effects the disenablement of the cruise control function for the first real speed, this speed still being kept memorized, and the adjustment of the second real speed may take place by means of the same actuating element by which also the first speed is adjusted. This constitutes a substantive alleviation of the load and prevents operator errors since the respective finger of the operator may remain at the same customary position for changing the speed. This is a special advantage with turn maneuvers when plowing where in addition to the actuation of the steering, additional control manipulations and the actuation of the steering brake are required.

An ergonomically beneficial arrangement consists in locating the actuating element and the at least one switch on an operating interface within the reach of at least one finger of the operator; in a preferred embodiment, the operating interface being disposed on a stationary control lever within the reach of the thumb and the hand holding the control lever. The combination of control lever and operating interface provides the benefit that the operation of the vehicle is not affected by vibrations thereof. In this manner, an undesired or badly proportioned adjustment of the speed on the occurrence of vibrations of the vehicle is prevented since for the control action a relative movement between the finger and its supported hand is sufficient.

In an especially preferred embodiment, the actuating elements consists of two momentary contact push button switches, one for increasing and one for decreasing the real speed. In combination with the electronic control, it is especially safe and useful to adjust the speeds only by the length of time during which the one or the other of the momentary contact switches is depressed. The adjustment rate of the actuators within the drive train (comprising the drive engine and the continuously variable transmission) then determines the rate of change of the driving speed. A large difference between the desired and real speed is thereby prevented such that the cruise control function is more exact and soft.

According to a further aspect of the invention, a method for changing the real speed of the work vehicle with a continuously variable transmission and an electronic control device with cruise control function is provided that comprises the following steps:

a) a first real speed is adjusted by means of a first actuating element, continuously memorized within the control device and maintained by the cruise control function as long as no readjustment is performed such that the first real speed that was finally adjusted, is kept memorized.

b) the cruise control function for the first real speed is disenabled on actuating a switch, whereupon a second real speed is commanded, This method is characterized in that said second real speed is a predetermined speed, especially of zero, corresponding to a standstill of the vehicle, in that by means of the actuating element a second real speed is adjusted for the maneuvering travel, said speed increasing up to a predetermined maximum value as long as the actuating element remains activated, and in that for returning from this second real speed to the first real speed memorized in the cruise control function, again a switch is actuated.

Further advantageous embodiments and developments are set out below. They ensure by their sensual perception and full use of the possibilities of an electronic control a maximum of operator convenience and safety. They are the result of detailed studies of movement of the operator.

An especially advantageous method for changing the speed on maneuvering with the assistance of an actuation of the foot brake on one side (steering brakes) and the forward/backward selection lever, comprises the following steps:

a) the vehicle is brought to a standstill by actuating the second switch, b) by means of the actuating element, a second real speed is adjusted for the maneuvering travel, said speed increasing up to a predetermined maximum value as long as the actuating element remains activated, c) a narrow turn is made with unilaterally actuated foot brake, d) the vehicle is brought to a standstill by releasing the actuating element, e) the forward/backward selection lever is brought into the backward position, f) the steps b), c) and d) are repeated on driving backwardly, all this repeatedly if required, and g) by actuating the first switch, the cruise control function for the memorized first real speed is re-enabled.

BRIEF SUMMARY OF THE SEVERAL VIEWS OF THE DRAWINGS

The invention is describe and explained below with reference to the drawings. In the drawings.

DETAILED DESCRIPTION OF THE INVENTION

Figure 1:
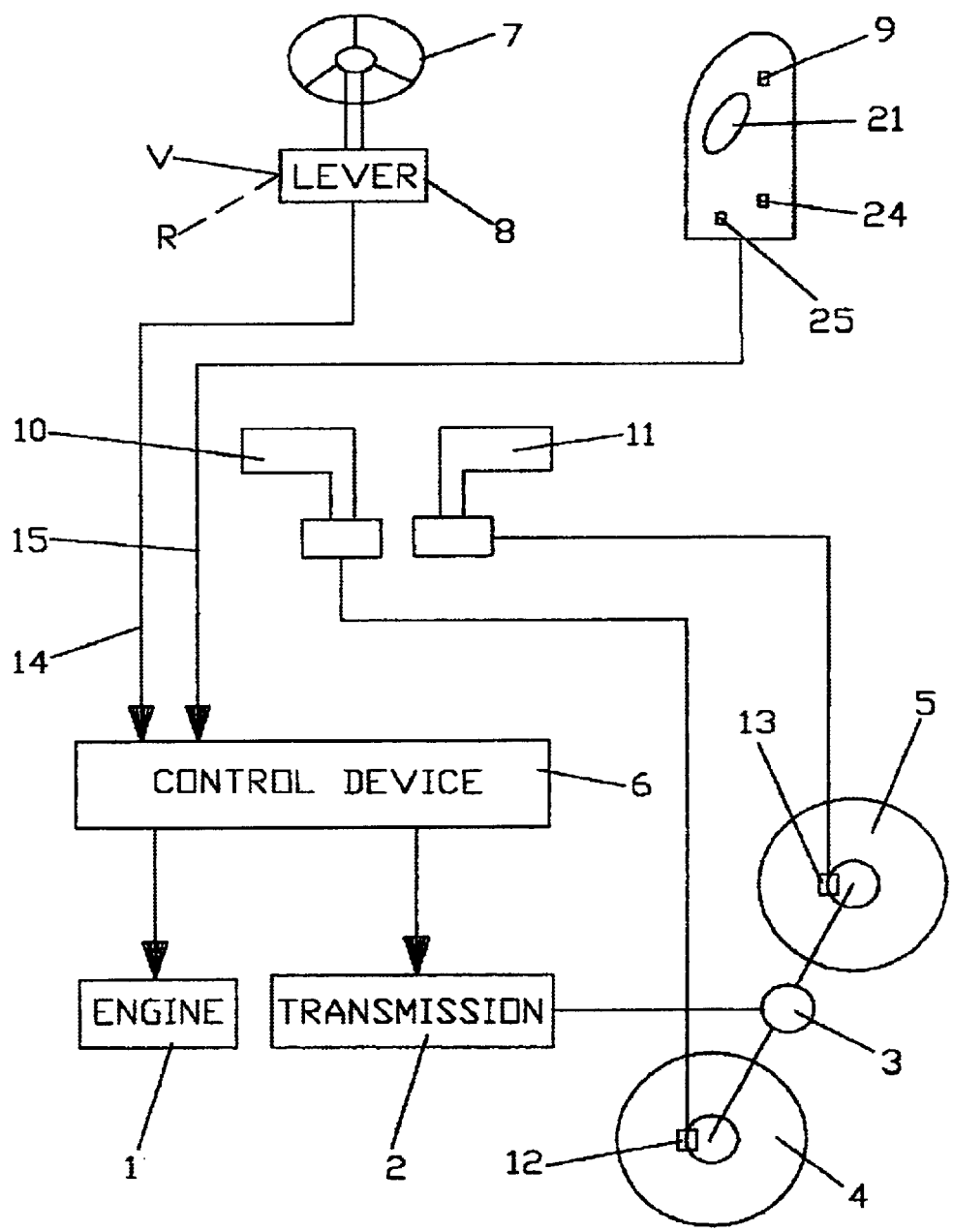
FIG. 1 schematically shows an agricultural tractor and the operator's cab thereof comprising the system according to the invention.

FIG. 1 schematically shows an agricultural tractor having an operator's cab. The drive train is formed by an engine 1 with a succeeding continuously variable transmission 2 and a differential gear 3 distributing the drive torque to the left and right rear wheels 4, 5. The engine 1 and the continuously variable transmission 2 are controlled by a control device 6. This may, for instance, be a control device performing the control method set out in the European Patent Application 98890183.1.

A forward/backward selection lever 8 is disposed near the steering wheel 7 which is only schematically shown, preferably such that this lever may be actuated by the hand actuating the steering wheel 7. Within the reach of the other hand of the operator, the actuating device 9, according the invention, is disposed. The two semi-pedals 10,11 are provided for braking, one (10) for actuating the brake of the left rear wheel 12 and the other one (11) for actuating the brake of the right rear wheel 13. In normal operation, semi-pedals 10, 11 are coupled with one another. To act as a steering brake, there they are individually actuable such that the respective in-turn rear wheel is braked. The control commands from the forward/backward selection lever 8 and the actuating device 9 are transmitted via cables 14, 15 to the control device 6. The control device is a microcomputer that repetitively performs a control program that may, among other things, also perform a cruise control function.

Figure 2:
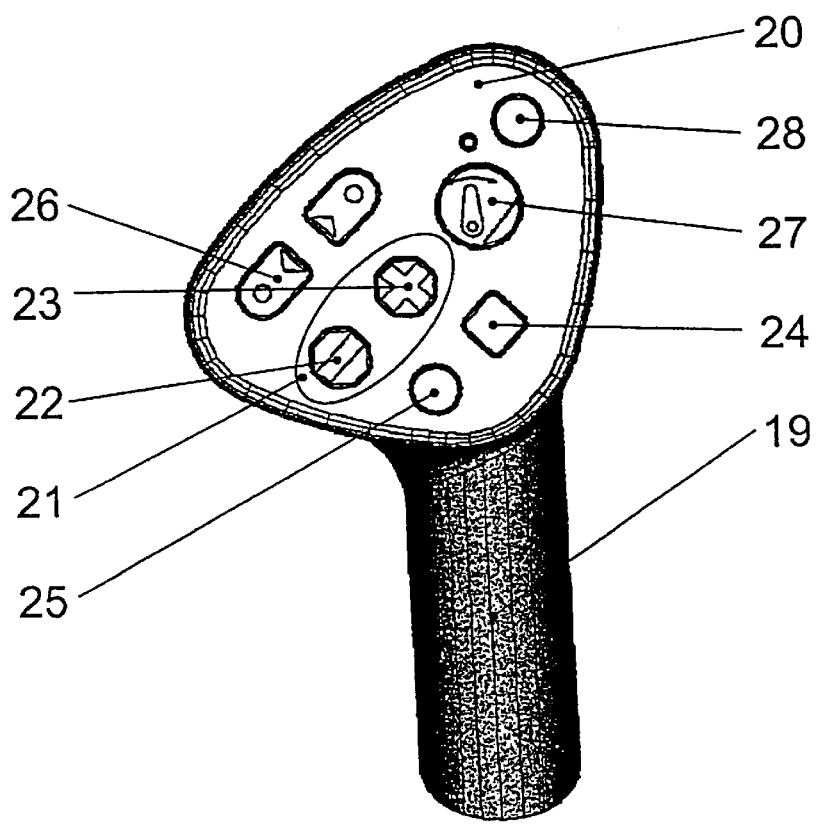
FIG. 2 shows a special embodiment of the system according to the invention.

FIG. 2 shows the system according to the invention in a preferred embodiment. Somewhere within reach of the second operating hand of the operator (the first one is at the steering wheel), for instance at the instrument board or preferably in prolongation of the arm rest, a preferably stationary hand lever 19 is provided, which is embraced by the hand of the operator. At the top end of the hand lever and within reach of the thumb (not shown), there is a control surface 20. On the control surface 20 there is provided an actuating element 21 for adjusting the real speed, said actuating element preferably consisting of two momentary push button switches 22, 23, the first one being clearly marked with a minus sign, and the second marked with a plus sign. By pressing the first switch, the real speed is decreased as long as this switch is maintained in the actuated state. By pressing the second switch 23, the speed is increased during the actuation thereof. A first switch 24 and a second switch 25 are preferably provided as push button toggle switches that alternatingly are moved into one or the other switch position upon pressing thereof.

The two switch positions of the first switch 24 (it might be marked with "thrust mode operation/steering brake") correspond to the following; the first position corresponds to the cruise control function for a first real speed that may be set by means of the actuation element 21, is memorized at each instant, and is kept memorized; whereas the second position corresponds to a situation wherein the cruise control function for the set first real speed is disenabled, this first real speed being still kept memorized, and a second real speed is set, that again is variable by means of the actuating element 21. This second speed may be memorized in the same manner as the first real speed such that on a subsequent actuation of the first switch 24, again the same second real speed is set. It may be provided that by pushing the first switch 24 again the first real speed memorized for the cruise control function is again set.

A second switch 25 (it might be marked with "cruise control on/off") effects a toggling between a cruise control drive with the first real speed and a fixed set reduced speed (cruise control switched off). If this speed equals zero, this switch may be used for stopping and even as emergency stop, respectively. It may be provided that after a standstill of the vehicle, the second real speed may be adjusted by the switch 25 such that by pressing the push button 23 of the actuating element 21 (actuation of the push button 22 would be without effect at a standstill), the speed is increased in accordance with a predetermined function up to a maximum speed and that the vehicle again comes to standstill on releasing the push button 23. On pressing this second switch 25 again, a return to a cruise control drive with the memorized first real speed is performed. It enhances the operational safety if also after disenabling the cruise control function by means of the first switch 24, a return to the cruise control function with the first real speed is obtained by actuating the switch 25. This may be obtained by ganging the two switches 24, 25.

On the control surface 20, there are also actuating elements that do not relate to the invention: such as, for example, switches 26, 27 which could control various lift device functions or auxiliary functions as well as control and alarm lights, like 28.

With the control elements and the control methods related thereto as described above, difficult driving maneuvers and driving situations may be handled in a simple and safe manner. Such maneuvers and situations are discussed and explained below with reference to FIGS. 3–5.

Figure 3:
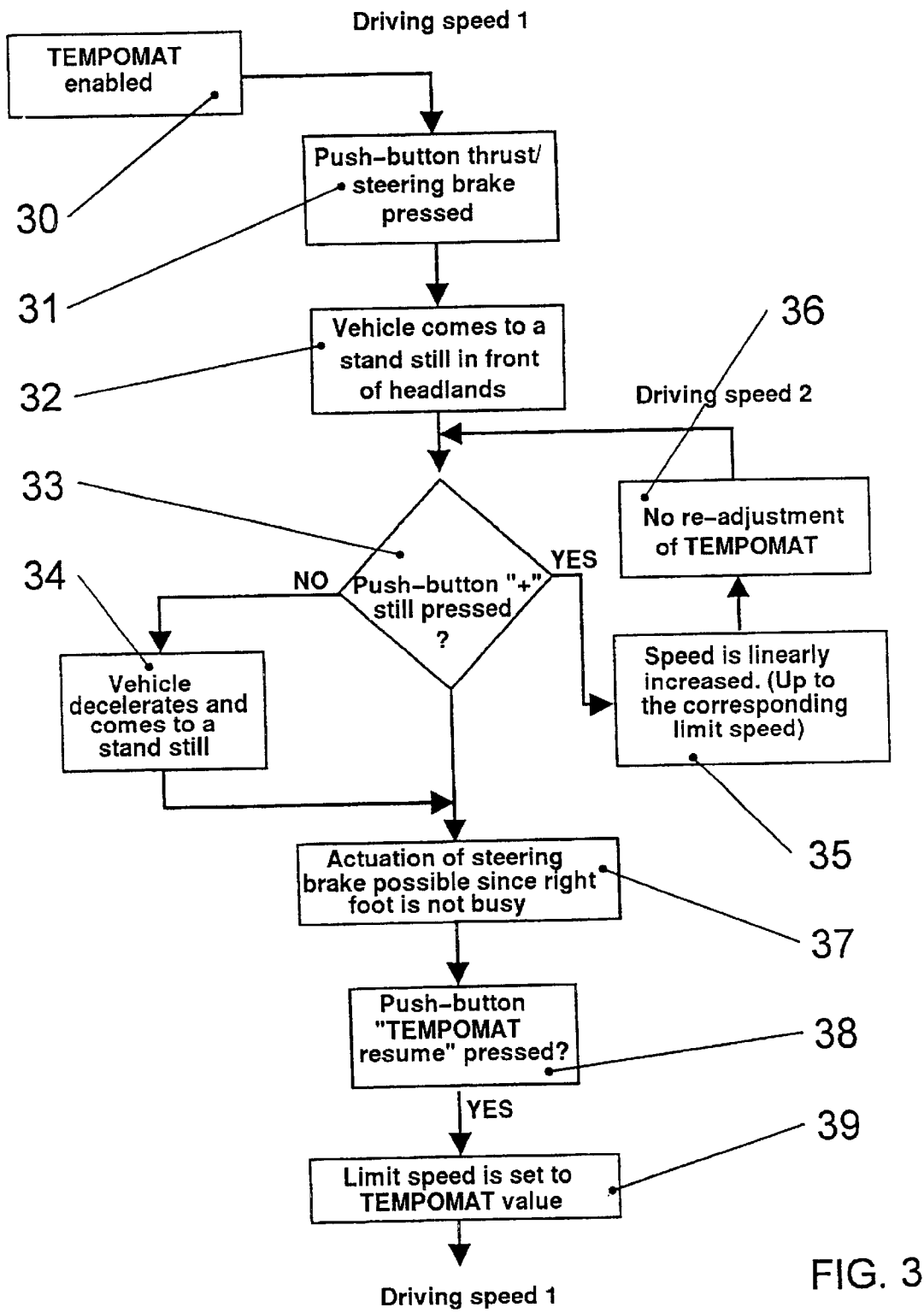
FIG. 3 shows a flow diagram of the method in a first operational situation.

FIG. 3 (variant 1) corresponds to a first driving situation: the turn at the headlands, for instance when plowing, with the assistance of the steering brake. During plowing, the cruise control is enabled (field 30) and the vehicle drives with a constant first speed. On approaching the headlands, the first switch 24 is pressed (box 31), and the vehicle reaches a standstill (32) in front of the headlands. The first speed is still memorized for the cruise control function. On slow turning, the speed starting from the standstill is now controlled by the actuating element 21, and for this purpose, it is continuously tested whether the push button 23 of the actuating element 21 is still pressed (box 33). As long as this push button is pressed (box 35), the second real speed is linearly increased up to a predetermined (relatively low) maximum speed, and this maximum speed will be kept as long as the push button is still pressed. The first speed in memory of the cruise control function will not be changed (36). As soon as the push button 23 is not pressed anymore ("no" in 33) the vehicle again comes to a standstill (34). During the slow driving condition, the actuation of the steering brakes is possible since the right foot is not busy. The change of speed is manually performed by means of the actuating element 21.

If the turn maneuver requires driving back and forth, it is now possible to switch by means of the forward/backward selection lever 8 to a backward motion, and on driving backward, again the boxes 33 through 37 may be executed. As soon as the vehicle has been turned and is in the correct position to enter the furrow again, the second switch 25 will be pressed. Thereby the cruise control function takes over again (box 38). The vehicle starts its movement again and continues with the first memorized speed (box 39).

Figure 4:
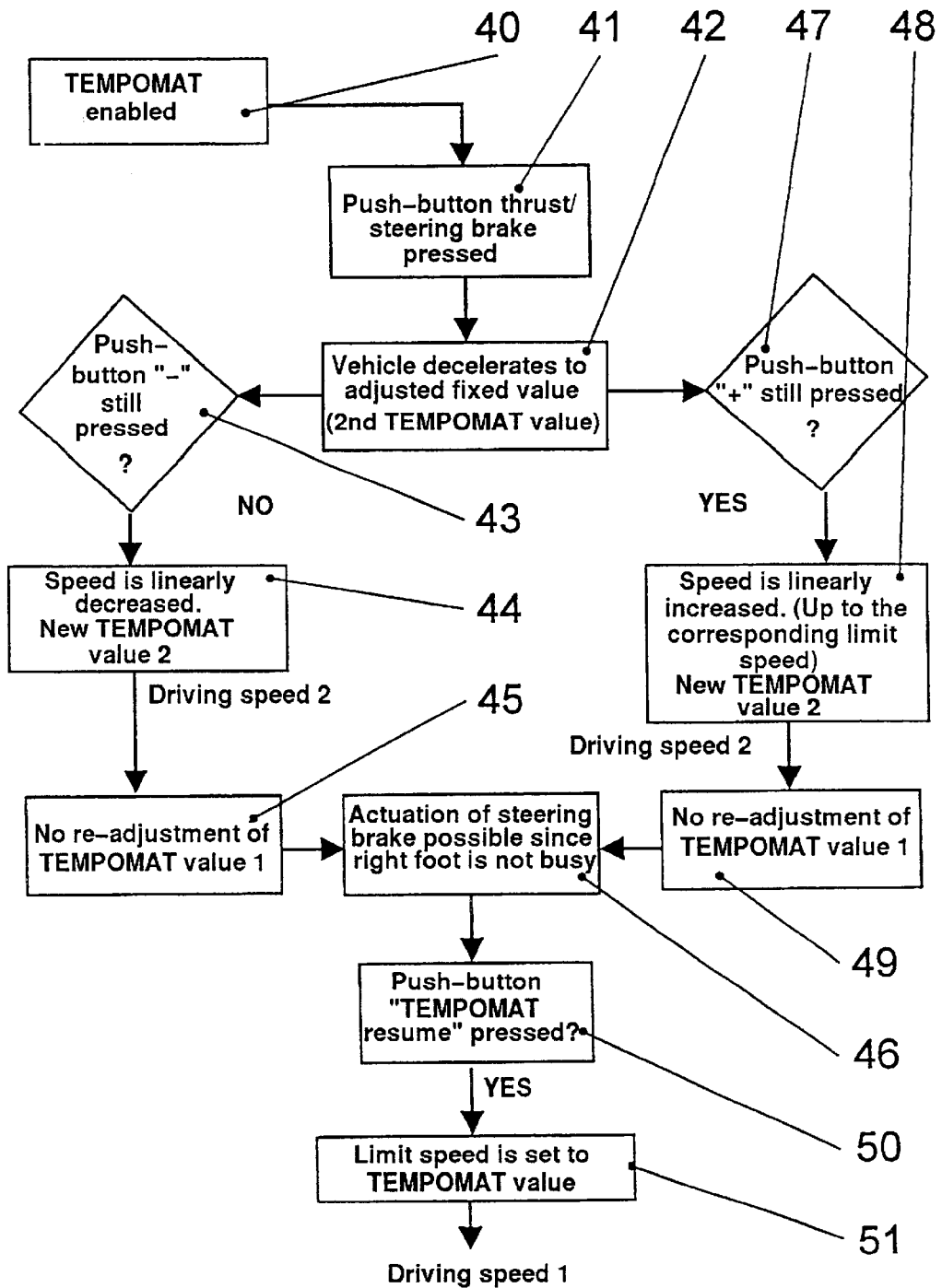
FIG. 4 shows a flow diagram of the method in a second operational situation.

In a second variant, on maneuvering, FIG. 4 is followed. Again, the initial situation is driving with enabled cruise control (box 40) with a constant first speed. By actuating the switch 24 (box 41) the speed is reduced to a fixed set second speed (42). This second speed may now be decreased or increased (box 44 or 48) by pressing one of the two push buttons 22 or 23 (box 43 or 47). The second speed set in this manner is memorized as a second cruise control value without changing the first cruise control value that corresponds to the first speed (box 45 or 49). On driving with the second driving speed, the right foot is not busy and therefore may be used for actuating the steering brake as required (box 46). As soon as a maneuver is completed, by pressing again the second switch 25 (box 50), a return to the first cruise control value and thereby to the first speed of the vehicle is performed (box 51). The second cruise control value for the second speed is still memorized in the background so that it is again activated on the next maneuver (box 42).

Figure 5:
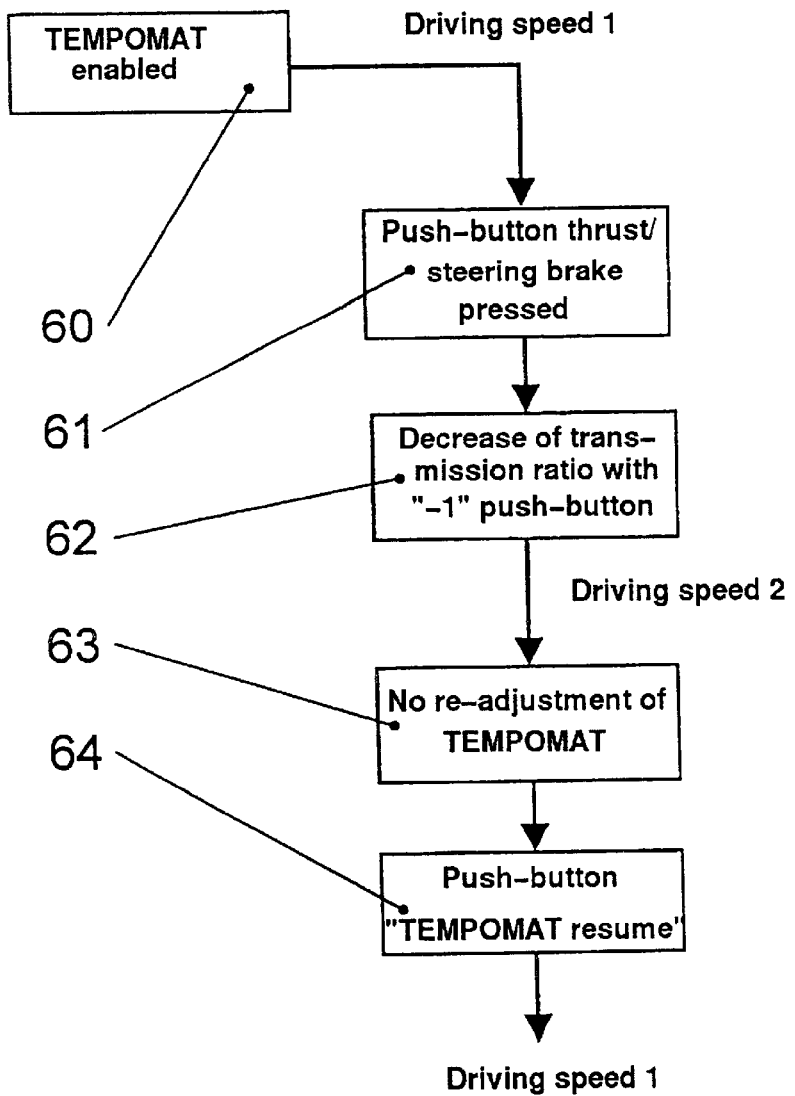
FIG. 5 shows a flow diagram of the method in a third operation situation.

In accordance with FIG. 5, the method according to the present invention also may be used in a thrust mode whereby driving safety and operator convenience are substantially enhanced. In the thrust mode, i.e., in driving downhill with braking action of the engine and a heavy towed load, there is the danger that the vehicle is unable, in spite of the cruise control function, to maintain the first speed controlled by the cruise control and continuously increases its speed under the action of the thrust of the load of the trailer. On driving downhill with a cruise control and a continuously variable transmission, with increasing driving speed the rotational speed of the engine either will decrease or it will be increased to increase the braking action, but this is only possible up to the maximum rotational speed of the engine. In both cases, on steep slopes and load thrust, it eventually becomes necessary to apply the brakes whereby the cruise control function is disenabled.

If on driving downhill, an increase of the speed is recognized with the cruise control function enabled (60), then the cruise control function for the first real speed is disenabled (box 61) by actuating the first switch 24—assuming the engine has not yet reached its maximum rotational speed—and by actuating the push button 22 of the actuation element 21, the transmission ratio is increased (box 62) resulting in an increase of the braking action of the engine. In this case, again the cruise control value corresponding to the first real speed is not changed (box 63). After traversing the slope, the cruise control is re-enabled by pressing the switch 25, and traveling continues at the first speed.

The driving situations described are only examples, many other situations may be thought of wherein the method according to the invention may be applied in the same manner with advantageous results, for instance in the operation of a front loader or a grader. Also these works may be performed in the manner described above in a very comfortable, fast and safe manner.

What is claimed is:

1. A system for changing the real speed of a work vehicle with a continuously variable transmission and an electronic control device having a cruise control function, comprising the following actuating elements:

a) an actuating element for changing the real speed of the vehicle, said real speed being continuously memorized as a first real speed and being maintained by the cruise control function if no re-adjustment takes place; and b) a first switch for disenabling and re-enabling the cruise control function, wherein the set first real speed is kept memorized on disabling and is set again on re-enabling, further comprising a second switch which, upon actuation, adjusts a second real speed, especially of zero, corresponding to a standstill of the vehicle, and by means of said actuating element said second real speed is adjustable for a maneuvering travel, said second real speed increasing up to a predetermined maximum value as long as said actuating element remains activated, and by actuating said second switch again, the cruise control function for said first real speed is re-enabled.

2. The system according to claim 1, wherein, upon activation of said first switch again, the cruise control function for said first real speed is re-enabled and said second real speed which was finally adjusted, is memorized.

3. The system according to claim 2, wherein said actuating element and said first and second switches are disposed on a control surface within the reach of a at least one finger of the operator.

4. The system according to claim 3, wherein, in use, said control surface is disposed on a stationary control lever within the reach of the thumb of the operator's hand holding the control lever.

5. The system according to claim 4, wherein said actuating element comprises two push buttons, one button for increasing and the other button for decreasing the real speed.

6. A method for changing the real speed of a work vehicle with a continuously variable transmission and an electronic control device with cruise control function, comprising the steps of:
   a) adjusting a first real speed of the vehicle by means of a first actuating element, continuously memorized within said control device and maintained by said cruise control function as long as no re-adjustment is performed such that said first real speed which was finally adjusted, is kept memorized;
   b) disenabling said cruise control function for said first real speed by actuating a switch, whereupon a second real speed is commanded, wherein, said second real speed is a predetermined speed, especially of zero, corresponding to a standstill of the vehicle, in that by means of said first actuating element a second real speed is adjusted for maneuvering travel, said second real speed increasing up to a predetermined maximum value as long as said first actuating element remains activated, and in that for returning from said second real speed to said first real speed memorized in said cruise control function, again a said switch is actuated.

7. The method for changing the real speed in accordance with claim 6, comprising the further step of adjusting said second real speed in the same manner as said first real speed by means of said first actuating element.

8. The method for changing the real speed according to claim 6, comprising the further step of memorizing said second real speed from the preceding disenablement of said cruise control function.

9. The method for changing the real speed according to claim 8 on maneuvering, comprising the further steps of:
   a) actuating said first switch to cause a transition from said first real speed to the memorized said second real speed,
   b) readjusting and memorizing said second real speed by means of said first actuating element, and
   c) actuating said first switch to re-enable said cruise control function for the memorized said first real speed.

10. The method for changing the real speed in accordance with claim 6, comprising the further steps of actuating a said first switch, adjusting said second real speed by means of said actuating element, and bringing said vehicle to a standstill by actuating a second switch.

11. The method for changing the real speed according to claim 10, comprising the further step of subsequently actuating said second switch to activate the memorized first real speed and memorize the second real speed.

12. The method for changing the speed according to claim 6, on maneuvering with the assistance of a unilateral actuation of a foot brake operably connected to said vehicle and of a forward/backward selection lever, starting from cruise control travel with the first real speed, comprising the steps of:
   a) stopping the vehicle by actuating said second switch,
   b) actuating by means of said first actuating element, said second real speed is adjusted for maneuvering travel, said second real speed increasing up to a predetermined maximum value as long as said first actuating element remains activated,
   c) making a narrow turn by unilaterally actuating said foot brake,
   d) stopping the vehicle by releasing said first actuating element,
   e) bringing said forward/backward selection lever into the backward position,
   f) repeating the actuating, making and stopping steps by driving backwardly, and
   g) actuating said first switch to re-enable said cruise control function for the memorized first real speed.

* * * * *